United States Patent
Hilden et al.

(10) Patent No.: US 8,311,547 B2
(45) Date of Patent: Nov. 13, 2012

(54) METHOD AND SYSTEM FOR MAINTAINING RESPONSE CENTER INFORMATION

(75) Inventors: Michael W. Hilden, Richardson, TX (US); Christopher D. Pikulinski, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 497 days.

(21) Appl. No.: 12/582,225

(22) Filed: Oct. 20, 2009

(65) Prior Publication Data

US 2011/0092182 A1    Apr. 21, 2011

(51) Int. Cl.
*H04M 11/04* (2006.01)
(52) U.S. Cl. .................................... 455/446
(58) Field of Classification Search ............. 455/404.1, 455/404.2, 412.1, 412.2, 414.1, 422.1, 432.3, 455/435.1, 456.1, 456.2, 456.3, 456.5; 379/37, 379/41, 45, 46, 47, 48, 49

See application file for complete search history.

(56) References Cited

U.S. PATENT DOCUMENTS

| | | | |
|---|---|---|---|
| 7,489,939 B2* | 2/2009 | Ashley et al. | 455/456.6 |
| 7,933,385 B2* | 4/2011 | Dickinson et al. | 379/45 |
| 8,116,723 B2* | 2/2012 | Kaltsukis | 455/404.2 |
| 2003/0086539 A1* | 5/2003 | McCalmont et al. | 379/45 |
| 2005/0190892 A1* | 9/2005 | Dawson et al. | 379/37 |
| 2010/0211300 A1* | 8/2010 | Jaffe et al. | 701/119 |

* cited by examiner

*Primary Examiner* — Jean Gelin

(57) ABSTRACT

A system for and method of maintaining response center information is presented. In one exemplary embodiment, the system for and method of maintaining response center information may comprise receiving, via an electronic interface, electronic data associated with emergency communications handling, processing, using a processor, the electronic data to associate a portion of the electronic data with a geographical boundary, identifying a modification to geographical boundary, and determining a communication address associated with the modification to the geographical boundary.

21 Claims, 3 Drawing Sheets

METHOD AND SYSTEM FOR MAINTAINING RESPONSE CENTER INFORMATION

BACKGROUND INFORMATION

Callers or other communicators to response centers are directed to a response center based on their geographic proximity to such a center. For example, a Public Safety Answering Point (PSAP) is a call center responsible for handling emergency communications such as 9-1-1 calls requesting an ambulance, fire, or police response for a particular geographic area. The geographic boundaries associated with response centers frequently change. For example, a response center, such as a city response center, may be consolidated with a county response center. An additional response center may be added and the boundaries for existing response centers may be redrawn to allow the new response center to handle a certain geographic area. Network equipment must be provisioned so that calls from a particular geographic area are directed to the appropriate call center. For example, routing a call to a correct PSAP improves emergency response times and call handling. Identifying changes to network equipment provisioning based on changes to geographical boundaries is a complex and challenging task.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

An exemplary embodiment provides a response center information maintenance system for one or more networks. The response center information maintenance system may facilitate maintenance and network administration associated with response center information.

Figure 1:
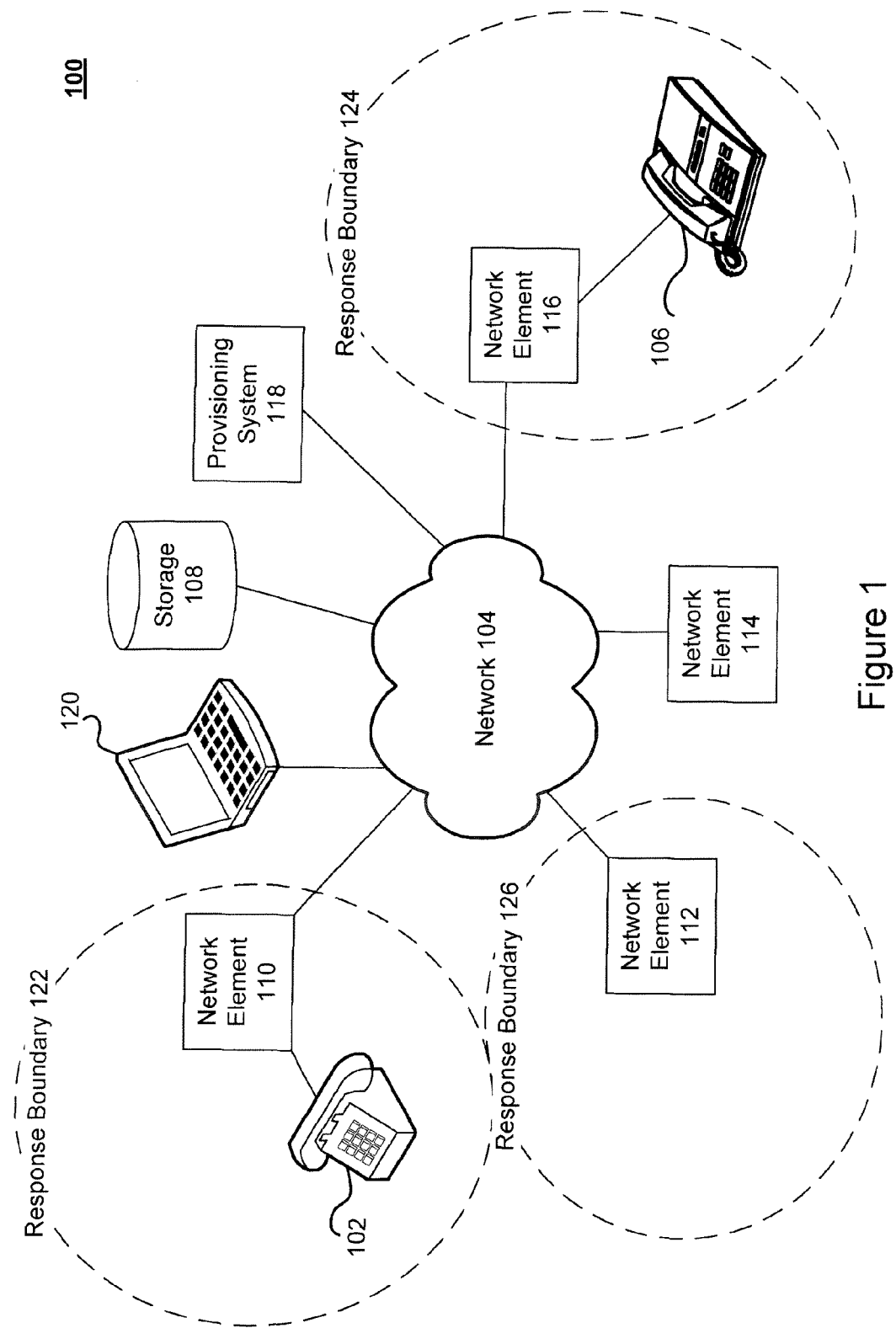
FIG. 1 is a schematic of a response center information maintenance system, in accordance with an exemplary embodiment.

Referring to FIG. 1, a response center information maintenance system in accordance with an exemplary embodiment is illustrated. As illustrated, the system 100 may include one or more networks, such as network 104. Network elements, such as network elements 110, 112, 114, and 116 and storage 108 may be communicatively coupled to network 104. One or more telecommunication devices 102 and 106 may be communicatively coupled to network 104 via network elements 110 and 116. Other devices such as computer 120 may also be communicatively coupled to network 104. Provisioning system 118 may also be communicatively coupled to network 104.

The telecommunication devices 102 and 106 may be wireline phones, wireless phones, satellite phones, Personal Digital Assistants (PDAs), computers, or other telecommunication capable devices. The telecommunication devices 102 and 106 may be communicatively coupled to the network 104. The telecommunication devices 102 and 106 and network elements 110, 112, 114, and 116 may send and receive data using one or more protocols. For example, data may be transmitted and received using Wireless Application Protocol (WAP), Multimedia Messaging Service (MMS), Enhanced Messaging Service (EMS), Short Message Service (SMS), Global System for Mobile Communications (GSM) based systems, Time Division Multiplexing (TDM) based systems, Code Division Multiple Access (CDMA) based systems, Transmission Control Protocol/Internet (TCP/IP) Protocols, or other protocols and systems suitable for transmitting and receiving data. Data may be transmitted and received wirelessly or may utilize cabled network connections or telecom connections such as an Ethernet RJ45/Category 5 Ethernet connection, a fiber connection, a traditional phone wireline connection, a cable connection or other wired network connection. Network elements 110, 112, 114, and 116 may use standard wireless protocols including IEEE 802.11a, 802.11b and 802.11g. Network elements 110, 112, 114, and 116 may also be communicatively coupled via protocols for a wired connection, such as an IEEE Ethernet 802.3.

Network 104 may be one or more of a wireless network, a wired network or any combination of wireless network and wired network. For example, network 104 may include one or more of a fiber optics network, a passive optical network, a cable network, an Internet network, a Public Switched Telephone Network (PSTN), a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, WEE 802.11a, 802.11b, 802.15.1, 802.11n and 802.11g or any other wired or wireless network for transmitting and receiving a data signal. In addition, network 104 may include, without limitation, telephone line, fiber optics, IEEE Ethernet 802.3, a wide area network ("WAN"), a local area network ("LAN"), or a global network such as the Internet. Also network 104 may support an Internet network, a wireless communication network, a cellular network, or the like, or any combination thereof. Network 104 may further include one, or any number of the exemplary types of networks mentioned above operating as a stand-alone network or in cooperation with each other. Network 104 may utilize one or more protocols of one or more network elements to which they are communicatively coupled. Network 104 may translate to or from other protocols to one or more protocols of network devices. Although network 104 is depicted as a single network, it should be appreciated that according to one or more embodiments, network 104 may each comprise a plurality of interconnected networks, such as, for example, a service provider network, the Internet, a service provider's network, a cable television network, corporate networks, and home networks.

Network elements 110, 112, 114, and 116 may each be one or more servers (or server-like devices), such as a Session Initiation Protocol (SIP) server. Network elements 110, 112, 114, and 116 may be telecom switches, Private Branch Exchanges (PBXs), routers, Voice Response Units (VRUs), announcement servers, voice mail servers or voice portals.

Network elements 110, 112, 114, and 116 may be VoIP (Voice Over Internet Protocol) enabled devices. Network elements 110, 112, 114, and 116 may include one or more processors (not shown) for recording, transmitting, receiving, and storing data. Although network elements 110, 112, 114, and 116 are depicted as individual servers, it should be appreciated that the contents of network elements 110, 112, 114, and 116 may be combined into fewer or greater numbers of servers (or server-like devices) and may be connected to one or more data storage systems such as storage 108.

Storage 108 may be network accessible storage and may be local, remote, or a combination thereof to network elements 110, 112, 114, and 116, and computer 120. Storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, storage 108 may be a database, such as an Oracle database, a Microsoft SQL Server database, a DB2 database, a MySQL database, a Sybase database, an object oriented database, a hierarchical database, or other database. Storage 108 may utilize flat file structures for storage of data. Storage 108 may utilize XML (eXtensible Markup Language) data structures.

Provisioning system 118 may be a network provisioning system that may provide automated provisioning of one or more network elements, such as network elements 110, 112, 114, and 116. Provisioning system 118 may provide provisioning of circuit switched based technology, VoIP based technology and other telecommunications equipment. Provisioning system 118 may provision, query, and verify routers, switches, network servers, redirect servers, SIP servers, trunk groups, and other network elements. Although depicted as a single system, provisioning system 118 may be a plurality of systems which may be interfaced, integrated, separate, or managed by a provisioning management system. For example, one provisioning system may be associated with VoIP equipment and one may be associated with circuit switched equipment.

Provisioning system 118 may also contain or be integrated with other components or systems such as a workflow management system. The workflow management system may handle sequencing and flow between provisioning tasks (e.g., ensuring that a switch is configured prior to configuring a SIP server or a redirect server to transfer calls to that switch). Provisioning system 118 may use telnet, SNMP (Simple Network Management Protocol), or other protocols to communicate with one or more network elements. Provisioning system 118 may use Service Oriented Architecture (SOA), TCL/TK (Tool Command Language/Tool Kit), and other technologies for network provisioning.

As illustrated in FIG. 1, response boundary 122, response boundary 124, and response boundary 126 may be exemplary response center geographic boundaries. For example, response boundary 122, response boundary 124, and response boundary 126 may be Public Safety Answering Points (PSAPs). A PSAP may be a call center responsible for handling emergency communications such as 9-1-1 calls requesting an ambulance, fire, or police response for a particular geographic area.

Computer 120 may be a desktop computer, a laptop computer, a server or other computer capable of maintaining response center information. Computer 120 may receive data from one or more of user input, a network management system, a network provisioning system, a management information base, a network services ordering system, a database, a file, a web service, and an application programming interface. Computer 120 may query other systems and local or remote storage to obtain network information. Computer 120 may interface with storage 108 and may use storage 108 for storage and retrieval of data associated with response centers, users, customers, subscribers, and network provisioning.

According to one or more embodiments, computer 120 may receive data associated with response centers. The data may be received via one or more interfaces. Computer 120 may use Application Programming Interfaces (APIs), interface tables, Remote Procedure Calls (RPCs), web services, Extensible Markup Language (XML) based interfaces, Simple Object Access Protocol (SOAP) based interfaces, Common Object Request Broker Architecture (CORBA), and other interfaces for sending or receiving information associated with response centers, user addresses, and network provisioning. According to some embodiments, data may be received via a storage medium including, but not limited to, tape, CD, DVD, a memory card, and magnetic storage. In such embodiments, the storage medium may be provided to an interface of computer 120 such as, by way of non-limiting example, a disk drive, an optical disk drive, a tape drive, a USB port, a memory card reader, a wireless interface, and a serial port. According to some embodiments, data may be entered via a user interface of computer 120. In some embodiments, data may be loaded onto storage accessible to computer 120 such as storage 108.

Computer 120 may receive data associated with a response center such as, for example, data associated with a Public Safety Answering Point (PSAP). According to at least one embodiment, the data may be received from a third party and provided to one or more service providers. Data may be transmitted or provided at regular intervals or may be transmitted or provided after the change of one or more attributes associated with a response center. According to at least one embodiment, the data may be queried or downloaded by a recipient such as a service provider.

Data received by computer 120 may contain one or more indicia of a PSAP including, but not limited to, an ID, a county name, a state name, and an agency name. The data may also contain one or more indicia of a geographic boundary associated with a response center such as a PSAP. For example, indicia of a geographic boundary may include longitude and latitude coordinates, cartesian coordinates, vector data, or geodetic datums. For example, geographical coordinates may represent a starting an ending point of one or more line segments forming a portion of a geographic boundary of a response center. Other response center attributes may be included in the received data. Computer 120 may parse received data and may convert received data into mapped data. Computer 120 may identify one or more response centers in the received data and geographic boundary data associated with the identified response centers. Computer 120 may create a geographical map in memory from the parsed data or may amend an existing map. Identified geographic coordinates may amend an existing boundary or add a new boundary for one or more response centers to a map. The geographic boundaries may indicate a geographic area associated with a response center such as a PSAP.

After receiving, parsing, and mapping data associated with one or more response centers, computer 120 may compare mapped data with one or more user addresses. User addresses may be addresses associated with telephone numbers, IP addresses, network addresses, email addresses, or other communication addresses. Computer 120 may identify one or more addresses associated with a response boundary that have been affected by modifications or additions to mapped data. For example, telecommunications device 102 may be associated with a street address that is in a particular response boundary, such as response boundary 126. A new response center may be added which is responsible for the geographical area encompassing the street address associated with telecommunications device 102. The response boundary associated with the new response center may be response boundary 122. As a result of the new response center response boundaries 122 and 126 may be redrawn. Telecommunications device 102 may be associated with a street address that is now in response boundary 122. Computer 120 may identify one or more network elements currently associated with telecommunications device 102 such as a switch, a router, a SIP server, a trunk group number, a network server, and a redirect server (e.g., network element 112). Computer 120 may identify one or more network elements to be associated with telecommunications device 102 based on the new response boundary 122, such as a switch, a router, a SIP server, a network server, and a redirect server. For example, network element 110 may be a telecom switch that handles calls associated with response boundary 122.

As another example of the comparison of mapped data with one or more users, computer 120 may evaluate telecommunications device 106. Telecommunications device 106 may be a VoIP based device whose address of record may have been in a response boundary associated with network element 114. As a result of a modification in response boundaries, the address associated with telecommunications device 106 may be in response boundary 124. Computer 120 may determine that telecommunications device 106 should now be associated with network element 116.

Computer 120 may generate one or more reports containing one or more communication addresses, a PSAP associated with a communication address, a PSAP to be associated with a communication address, indicators of equipment to be associated with communication addresses as a result of a modification to a geographic boundary, indicators of equipment currently associated with communication addresses, identifiers of users associated with communication addresses, and geographical addresses associated with communication addresses. One or more indicators of equipment may be Common Language Location Identifier (CLLI) codes or may contain CLLI codes. Computer 120 may provide a user interface for report functionality including, but not limited to, formatting reports, viewing reports, editing reports, distributing reports, and approving reports. Computer 120 may distribute reports by one or more methods including, but not limited to, email, posting to a website, XML, FTP, and via printing.

According to one or more embodiments, computer 120 may facilitate the distribution of a report to one or more users who may review proposed network provisioning changes associated with a response boundary prior to network changes. For example, computer 120 may generate a report showing that telecommunications device 102 is to be associated with response boundary 122 via network element 110. The report may also show that telecommunications device 102 is currently associated with a response boundary 126, the geographic address associated with telecommunications device 102, user information associated with telecommunications device 102, one or more network elements associated with telecommunications device 102, and network element configuration information. Network elements may be represent by indicators containing Common Language Location Identifier (CLLI) codes. The report may further show configuration information and provisioning information to be used for provisioning telecommunications device 102 on network element 110. If the report is approved by one or more users or reviewers the provisioning changes to move telecommunications device 102 from network element 112 to network element 110 may occur (e.g., one or more switches, SIP servers, network servers, or redirect servers may be provisioned).

According to some embodiments, after a report is approved the changes in the report may be automatically provisioned. For example, a user may update information in one or both of computer 120 and provisioning system 118 to indicate that provisioning has been approved. Provisioning system 118 may use workflow or other technologies to sequence a series of tasks to provision one or more network elements in accordance with changes approved in the report. If a report is not approved, it may be edited and resubmitted for approval. According to some embodiments, a report may be regenerated and then submitted for approval. For example, new equipment or capacity may be added to a network and the report may be regenerated to reflect provisioning on new equipment. According to one or more embodiments, a report may be generated after the completion of provisioning. A report generated after the completion of provisioning may include information associated with network configuration changes, verification testing, affected communication addresses, affected users, and other details.

The various components of the system 100 as shown in FIG. 1 may be further duplicated, combined and/or integrated to support various applications and platforms. Additional elements may also be implemented in the systems described above to support various applications. One or more portions of system 100 may be implemented in executable software code stored on a computer readable medium.

Figure 2:
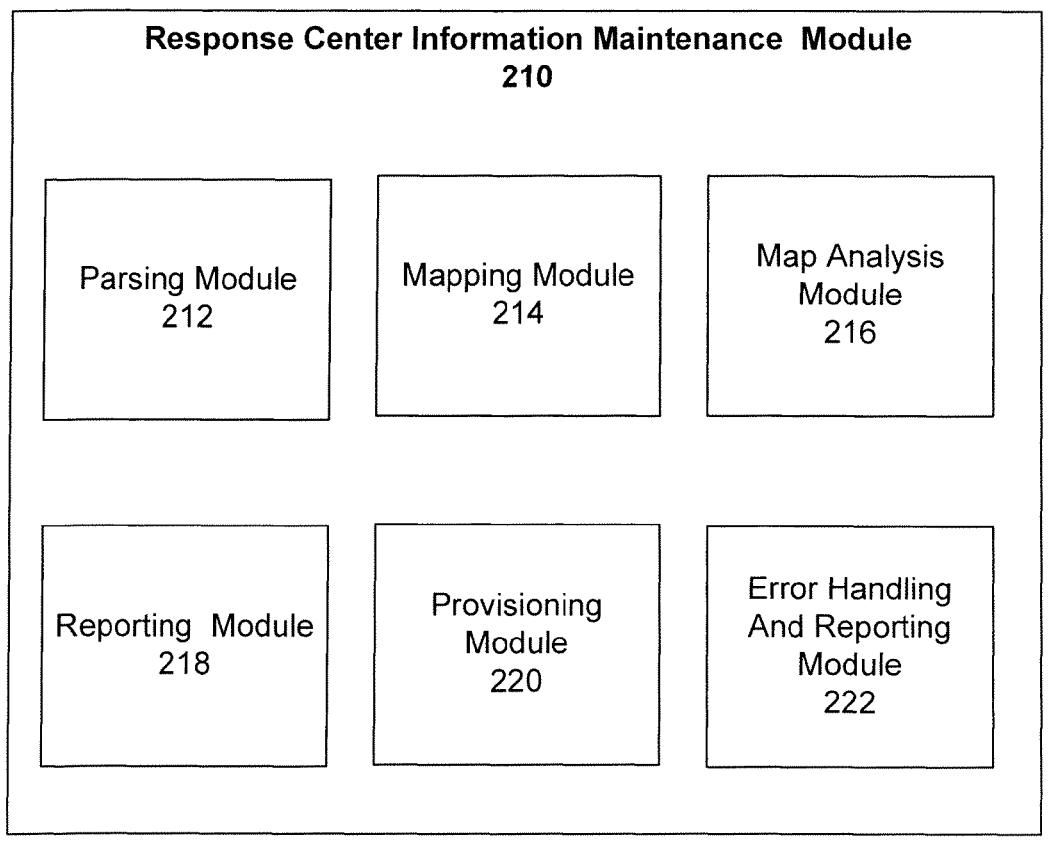
FIG. 2 depicts a block diagram of a module for a response center information maintenance system, in accordance with an exemplary embodiment.

Referring to FIG. 2, a response center information maintenance module 210 is depicted, in accordance with an exemplary embodiment. As illustrated, the response center information maintenance 210 may contain one or more components including a parsing module 212, a mapping module 214, a map analysis module 216, a reporting module 218, a provisioning module 220, and an error handling module 222. The response center information maintenance module 210 may maintain data associated with response centers such as PSAPs. Response center information maintenance module 210 may receive data via one or more interfaces.

Parsing module 212 may parse received data. Parsing module 212 may parse received data to associate one or more portions of the received data with one or more geographical boundaries. Parsing module 212 may identify one or more indicia of a geographic boundary in the received data, such as, by way of non-limiting example, an ID, a county name, a state name, and an agency name. According to some embodiments, parsing module 212 may identify geographic boundary data which may include longitude and latitude coordinates, cartesian coordinates, vector data, or geodetic datums. Once received data has been parsed, it may be mapped.

Mapping module 214 may map a geographic boundary or a modification to a geographic boundary identified by one or more geographic boundary markers parsed from received data. Mapping module 214 may use stored map data reflecting current boundary information for response centers and may apply one or more modifications based on the parsed data. For example, data reflecting PSAP boundaries may be stored in storage 108 or locally on computer 120. Mapping module 214 may apply one or more changes to such data based on received data. Received data may comprise a change to an existing boundary such as, for example, coordinates indicating a particular side has expanded to include an area (e.g., a town has consolidated its PSAP with the county).

Received data may also comprise the creation of a new boundary (e.g., a city has created its own response center), or other modifications (e.g., due to consolidation one PSAP has been removed and another enlarged). After one or more portions of received data have been mapped the impact of modifications to response center boundaries may be analyzed.

Map analysis module 216 may analyze the impact to response center boundaries. Map analysis module 216 may compare boundary modifications with one or more communication addresses. For example, map analysis module 216 may compare a region added to a response center boundary with addresses associated with telephone numbers. If one or more telephone numbers are associated with user addresses located in the region added to a response center boundary, map analysis module 216 may identify the one or more telephone numbers. In another example, if a response center has been added, map analysis module 216 may identify one or more communication addresses within the response center boundary. According to some embodiments, other communication addresses such as an IP number, a network address, and an email address may also be identified. The one or more identified communication addresses may be flagged, stored, or otherwise indicated for modification. Map analysis module 216 may determine network elements currently associated with one or more communication addresses (e.g., a switch or a SIP server), network elements to be associated with one or more communication addresses, one or more user attributes of a user associated with a communication address (e.g., an identifier), and other details related to the impact of a boundary modification.

Reporting module 218 may generate one or more reports containing one or more communication addresses, indicators of equipment to be associated with communication addresses as a result of a modification to a geographic boundary, indicators of equipment currently associated with communication addresses, identifiers of users associated with communication addresses, and geographical addresses associated with communication addresses. One or more indicators of equipment may be Common Language Location Identifier (CLLI) codes or may contain CLLI codes. Reporting module 218 may distribute reports by one or more methods including, but not limited to, email, posting to a website, XML, FTP, and via printing.

According to one or more embodiments, reporting module 218 may allow the distribution of a report to one or more users who may review proposed network provisioning changes associated with a response boundary prior to network changes. If a report is approved by one or more users or reviewers, the provisioning changes may be sent to provisioning module 220.

According to one or more embodiments, provisioning module 220 may receive a report from reporting module 218 and may extract one or more portions of data to generate provisioning commands. Provisioning module 220 may receive data associated with network elements to be provisioned to associate one or more communication addresses with a response center boundary. For example, provisioning module 220 may receive data associated with a communication address (e.g., a telephone number) and data associated with one or more network elements (e.g., a switch or a SIP server). Provisioning module 220 may also receive or generate configuration information. According to some embodiments, some configuration information may be based at least in part on a current configuration (e.g., the service level and telephone number may be the same as a prior configuration, but a redirect server or network server associated with the telephone number may change based on a PSAP boundary change).

Provisioning module 220 may also contain or be integrated with other components or systems such as a workflow management system. The workflow management system may handle sequencing and flow between provisioning tasks (e.g., ensuring that a switch is configured prior to configuring a SIP server or a redirect server to transfer calls to that switch). Provisioning module 220 may generate commands using telnet, FTP, SNMP (Simple Network Management Protocol), or other protocols to communicate with one or more network elements. Provisioning module 220 may use Service Oriented Architecture (SOA), TCL/TK (Tool Command Language/Tool Kit), and other technologies for network provisioning.

The error handling module 222 may respond to one or more errors created by parsing module 212, mapping module 214, map analysis module 216, reporting module 218, and provisioning module 220. The error handling module 222 may provide error trapping and one or more error handling actions. In some embodiments, the error handling module 222 may provide information about errors occurring during parsing of received data, identification of response centers, mapping of response center boundaries, generation of reports, and provisioning of network changes. Error handling module 222 may provide alerts, may allow retrying of an action (e.g., provisioning a network element), and may allow rollback to a prior configuration.

Figure 3:
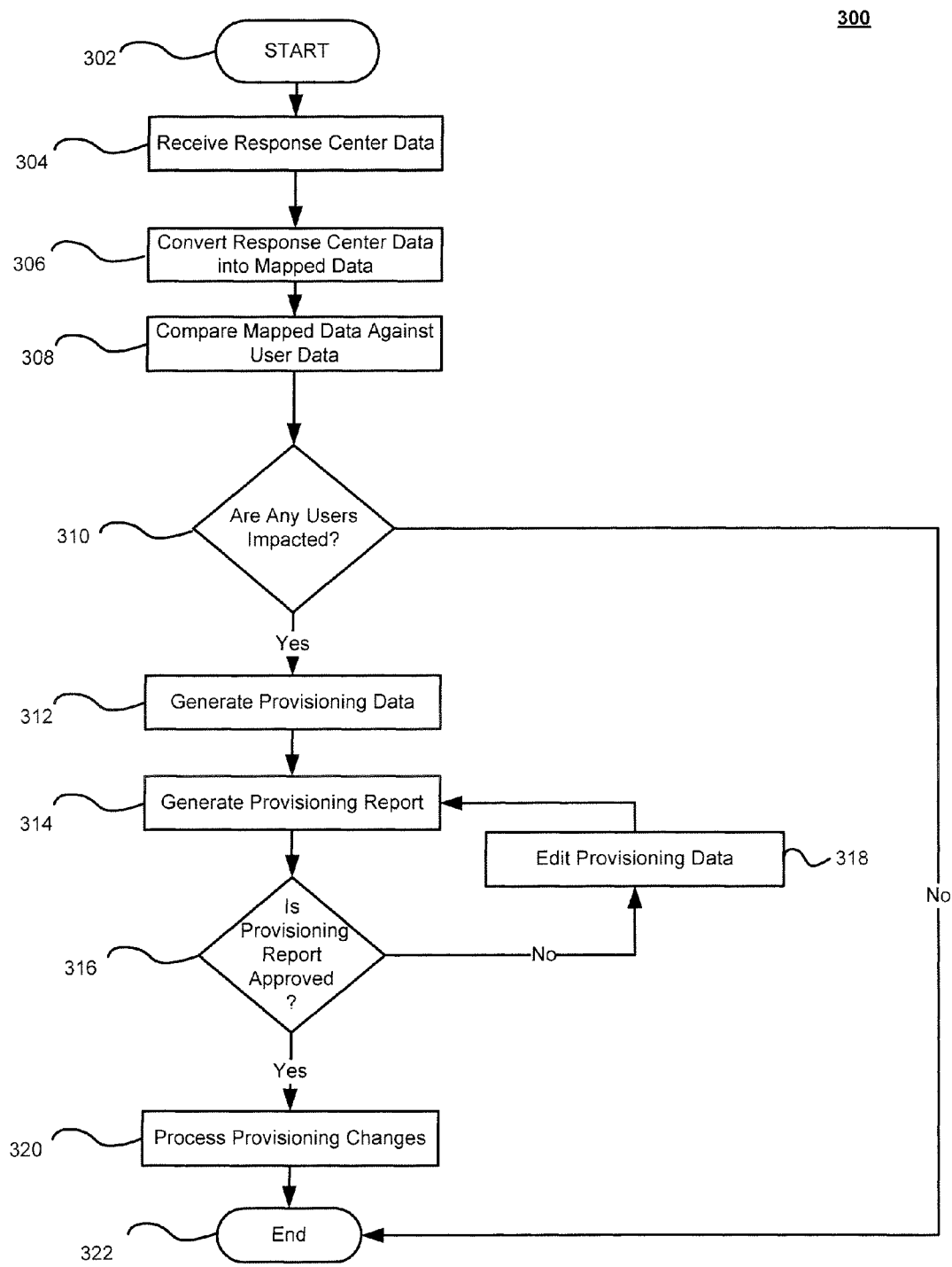
FIG. 3 depicts a flow chart for a method for implementing a response center information maintenance system, in accordance with an exemplary embodiment.

FIG. 3 depicts a flowchart of a method for implementing a response center information maintenance system 300, according to an exemplary embodiment. The method 300 is provided by way of example, as there are a variety of ways to carry out methods disclosed herein. The method 300 shown in FIG. 3 may be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 3 represents one or more processes, methods, or subroutines carried in the exemplary method 300. A computer readable media comprising code to perform the acts of the method 300 may also be provided. Referring to FIG. 3, the exemplary method 300 may begin at block 302.

At block 304, response center data may be received and parsed. Data may be received by one or more interfaces. Parsing of data may be performed by computer 120, parsing module 212, or another network element.

At block 306, parsed response center data may be converted into mapped data. Identified geographic information may be used to create a map of response center boundaries or to modify and existing map of response center boundaries. Mapped data may be stored or retrieved from electronic storage such as storage 108.

At block 308, mapped data may be compared against user data. For example, user data, subscriber data, or customer data may be searched for geographic information associated with a communication address (e.g., a street address associated with a telephone number). Addresses associated with communication addresses (e.g., phone numbers) may be compared with changes in response center boundaries to determine whether any communication addresses are affected by a change in response center boundaries. For example, an address associated with a phone number may be converted to coordinates to determine whether the coordinates lie within a changed area of a response center boundary. Coordinates may also be plotted on a map.

At block 310, the method 300 may determine whether any users are affected by changes in response center boundaries. If one or more users are affected the method 300 may continue at block 312. If no users are affected the method may end at block 322. According to some embodiments, even if no users are affected a report may be generated providing information about response centers affected and boundary changes.

At block 312, provisioning data may be generated for one or more users affected by response center boundary changes. Provisioning data may include, by way of non-limiting example, indicators of equipment to be associated with communication addresses as a result of a modification to a geographic boundary, indicators of equipment currently associated with communication addresses, network addresses for equipment, CLLI codes associated with equipment, provisioning commands, scripts, provisioning interface information, equipment configuration information, and credential information.

At block 314, one or more reports may be generated containing data such as, for example, one or more communication addresses, indicators of equipment to be associated with communication addresses as a result of a modification to a geographic boundary, indicators of equipment currently associated with communication addresses, identifiers of users associated with communication addresses, and geographical addresses associated with communication addresses. One or more indicators of equipment may be Common Language Location Identifier (CLLI) codes or may contain CLLI codes. Reports may be distributed by one or more methods including, but not limited to, email, posting to a website, XML, FTP, and via printing. According to some embodiments, one or more reports may contain maps indicating response boundary changes and addresses associated with phone numbers of users.

At block 316, the method 300 may determine whether a provisioning report is approved. A provisioning report may be distributed for approval to a network management group, a network translations group, or other administrative entity responsible for overseeing response center network administration. If the report is approved, the method 300 may continue at block 320. If the report is not approved, the method 300 may continue at block 318.

At block 318, provisioning data may be edited. For example, a report may be rejected because of a network capacity issue on a SIP server, switch, trunk group or other network element that a communication address (e.g., a telephone number) is to be migrated to. Provisioning data may be edited to migrate the communication address to a different SIP server, switch, trunk group, or other network element. Other identified issues with proposed provisioning data, existing provisioning data, customer information, or other report items may be edited.

At block 320 one or more provisioning changes may be processed. Provisioning may use provisioning data generated in block 312. Provisioning may use telnet, SNMP (Simple Network Management Protocol), or other protocols to communicate with one or more network elements. Provisioning may use Service Oriented Architecture (SOA), TCL/TK (Tool Command Language/Tool Kit), and other technologies for network provisioning. According to one or more embodiments, provisioning may be comprised of a plurality of provisioning systems managed by an activation manager or workflow system. For example, a workflow system may generate tasks to be completed by a plurality of provisioning systems and sequences for the provisioning tasks. According to some embodiments, some provisioning tasks may occur concurrently. Some provisioning tasks may be dependent upon the successful completion of other provisioning tasks. Separate, integrated, or interfaced provisioning systems may include, for example, a provisioning system for VoIP associated network elements, a provisioning system for network switches, and a provisioning system for redirect servers, SIP servers, and network servers. At block 322, the method may end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method, comprising:
receiving, via an electronic interface, electronic data associated with emergency communications handling;
processing, using a processor, the electronic data to associate a portion of the electronic data with a geographical boundary;
identifying a modification to the geographical boundary; and
determining a communication address associated with the modification to the geographical boundary
wherein identifying a modification to the geographical boundary comprises:
dentifying one or more geographical boundary markers in the electronic data;
mapping a boundary identified by the one or more geographic boundary markers; and
comparing the mapped boundary with a stored geographic boundary.

2. The method of claim 1, wherein the geographic boundary comprises a geographic boundary associated with a Public Safety Answering Points (PSAP).

3. The method of claim 1, wherein associating a portion of the electronic data with the geographical boundary comprises identifying one or more indicia of a geographic boundary in the electronic data.

4. The method of claim 3, wherein the one or more indicia of a geographic boundary comprise at least one of: an ID, a county name, a state name, and an agency name.

5. The method of claim 1, wherein the one or more geographic boundary markers comprise markers associated with longitude and latitude coordinates.

6. The method of claim 1, wherein the stored geographic boundary is stored in a database.

7. The method of claim 1, wherein the emergency communications handling comprises 9-1-1 calls.

8. The method of claim 1, wherein determining the communication address associated with the modification to the geographical boundary comprises: identifying a communication address to be associated with a Public Safety Answering Point (PSAP) as a result of the modification to the geographic boundary.

9. The method of claim 1, wherein the communication address comprises a phone number associated with a user of a communications service.

10. The method of claim 1, further comprising generating a report containing at least one communication address associated with the modification to the geographic boundary.

11. The method of claim 10, wherein the report contains at least one of: a PSAP currently associated with a communication address, a PSAP to be associated with a communication address, an indicator of equipment to be associated with the communication address as a result of a modification to a geographic boundary, a indicator of equipment currently associated with the communication address, an identifier of a user associated with the communication address, and a geographical address associated with the communication address.

12. The method of claim 11, wherein at least one of the indicators of equipment comprises a Common Language Location Identifier (CLLI) code.

13. The method of claim 10, further comprising confirming a network provisioning change identified in the report.

14. The method of claim 13, further comprising provisioning a confirmed network change to associate at least one communication address with a Public Safety Answering Point (PSAP).

15. A non-transitory computer readable media comprising code to perform the acts of the method of claim 1.

16. A system, comprising:
an interface for receiving electronic data associated with emergency communications handling;
a processor communicatively coupled to the interface, wherein the processor is configured to:
process the electronic data to associate a portion of the electronic data with a geographical boundary;
identify a modification to the geographical boundary; and
determine a communication address associated with the modification to the geographical boundary
wherein identify a modification to geographical boundaries comprises:
identify one or more geographical boundary markers in the electronic data;
map a boundary identified by the one or more geographic boundary markers; and
compare the mapped boundary with a stored geographic boundary.

17. The system of claim 16, wherein the geographic boundary comprises a geographic boundary associated with a Public Safety Answering Points (PSAP).

18. The system of claim 16, wherein the one or more geographic boundary markers comprise markers associated with longitude and latitude coordinates.

19. The system of claim 16, wherein the emergency communications handling comprises 9-1-1 calls.

20. The system of claim 16, further comprising: a report generator for generating a report containing one or more communication addresses associated with the modifications to the geographic boundaries.

21. The system of claim 20, further comprising: a network provisioning system for provisioning one or more network elements to associate the one or more communication addresses contained in the report with the one or more network elements.

* * * * *